(12) United States Patent
Kirschner

(10) Patent No.: US 6,749,359 B1
(45) Date of Patent: Jun. 15, 2004

(54) SEISMIC SUSPENSION SYSTEM

(75) Inventor: Kraig A. Kirschner, Corona, CA (US)

(73) Assignee: Automated Fire Control, Incorporated, South El Monte, CA (US)

( * ) Notice: Subject to any disclaimer, the term of this patent is extended or adjusted under 35 U.S.C. 154(b) by 77 days.

(21) Appl. No.: 09/844,807

(22) Filed: Apr. 27, 2001

(51) Int. Cl.$^7$ ................................................. E04B 1/98
(52) U.S. Cl. ........................... 403/338; 52/39; 52/167.1
(58) Field of Search ................. 52/39, 167.1, 655.1; 248/58, 59, 62; 411/84, 85; 403/388, 374.3

(56) References Cited

U.S. PATENT DOCUMENTS

| | | | | |
|---|---|---|---|---|
| 1,893,481 A | * | 1/1933 | Adams | 52/489.1 |
| 2,944,642 A | * | 7/1960 | Evans | 403/22 |
| 4,073,113 A | * | 2/1978 | Oudot et al. | 403/189 |
| 4,362,422 A | * | 12/1982 | Zinkann et al. | 403/387 |
| 4,408,928 A | * | 10/1983 | Steinke | 403/320 |
| 4,830,531 A | * | 5/1989 | Condit et al. | 403/348 |
| 4,950,099 A | * | 8/1990 | Roellin | 403/348 |
| 5,259,165 A | * | 11/1993 | Koyama | 403/387 |
| RE35,479 E | * | 3/1997 | Witherbee et al. | |
| 6,290,426 B1 | * | 9/2001 | van Gijsel et al. | 403/247 |

OTHER PUBLICATIONS

Afcon Flyer *962 Square Washer* (1 page).

* cited by examiner

*Primary Examiner*—James R. Brittain
(74) *Attorney, Agent, or Firm*—Fulbright & Jaworski L.L.P.

(57) ABSTRACT

A seismic adapter for attachment to a steel web joist. The joist includes a pair of angled elements which extend parallel to one another with a cord space therebetween. The adapter includes an anchor plate juxtaposed with the upper surface of the element pair and an engagement plate engaging the parallel edges of the legs of the element pair. A threaded stud attaches to the anchor plate and extends through the engagement plate. The extension of the stud provides for the attachment to a hanger adapter brought together by a nut on the stud. The engagement plate includes a flat anchor portion and upstanding engagement portions having distal edges with interlocking engagement profiles including a tongue and outwardly extending shoulders to receive the parallel edges of the angle element pair.

3 Claims, 1 Drawing Sheet

SEISMIC SUSPENSION SYSTEM

BACKGROUND OF THE INVENTION

The field of the present invention is building construction hardware for mounting components such as utilities.

Building construction frequently uses steel web joists. Such devices employ two beams. The beams are mutually parallel and spaced apart to create a large moment of inertia for the joist. Cord elements extend at angles between the two so the beams will act as one in bending. Each beam includes a set of two elongate angle elements which are also mutually parallel. The cord elements extend for anchoring to between the elongate angle elements which form a cord space to receive the elements. Each angle element includes two legs extending at a right angle to one another, a first leg which is parallel with the first leg of the other angle element to define the cord space and a second leg extending in the opposite direction from the second leg of the other angle element to generally define a plane. The two first legs extend to define parallel edges.

Seismic adapters have been associated with such steel web joists by positioning two flat washers about one of the sets of angle elements. One washer lies in the plane of the second legs such that it extends across the cord space in juxtaposition with the second legs. A second washer is arranged to abut against the parallel edges of the first legs, also extending across the cord space. A threaded stud extends between the washers with a nut or bolt head retaining the first washer in juxtaposition with the second legs. The threaded stud extends beyond the second washer to accommodate attachment hardware. The entire assembly is then clamped to the joist by threading a nut up snug against the attachment hardware and, in turn, the second washer. Although this system is structurally sound, there is some prospect of limited lateral movement of the attachment.

SUMMARY OF THE INVENTION

The present invention is directed to a seismic suspension system. The system comprises a steel web joist including a beam with two angle elements. Each angle element includes a first leg and a second leg, the first legs being parallel with a cord space therebetween and the second legs extending in opposite directions. An anchor plate having a hole therethrough is positionable across the cord space into juxtaposition with the second legs of the beam. An engagement plate having a hole therethrough abuts up against the parallel edges of the first legs of the beam. A threaded stud extends from the anchor plate to and beyond a hole in the engagement plate. The engagement plate is able to interlock with the first legs.

In a first separate aspect of the present invention, the engagement plate includes a flat anchor portion and upstanding engagement portions to either side of the flat anchor portion. The engagement portions have distal edges with an engagement profile for interlocking engagement with the beam. This greatly restricts or eliminates any lateral movement of the adapter.

In a second separate aspect of the present invention, the engagement plate includes distal edges with tongues extendible to between the parallel legs of the steel web joist beam for interlocking engagement. The tongues may be tapered to accommodate variations in the cord space. Shoulders to either side of each tongue may abut against the edges of the legs.

Accordingly, it is an object of the present invention to provide an improved selsmic suspension system. Other and further objects and advantages will appear hereafter.

DETAILED DESCRIPTION OF THE PREFERRED EMBODIMENT

Figure 1:
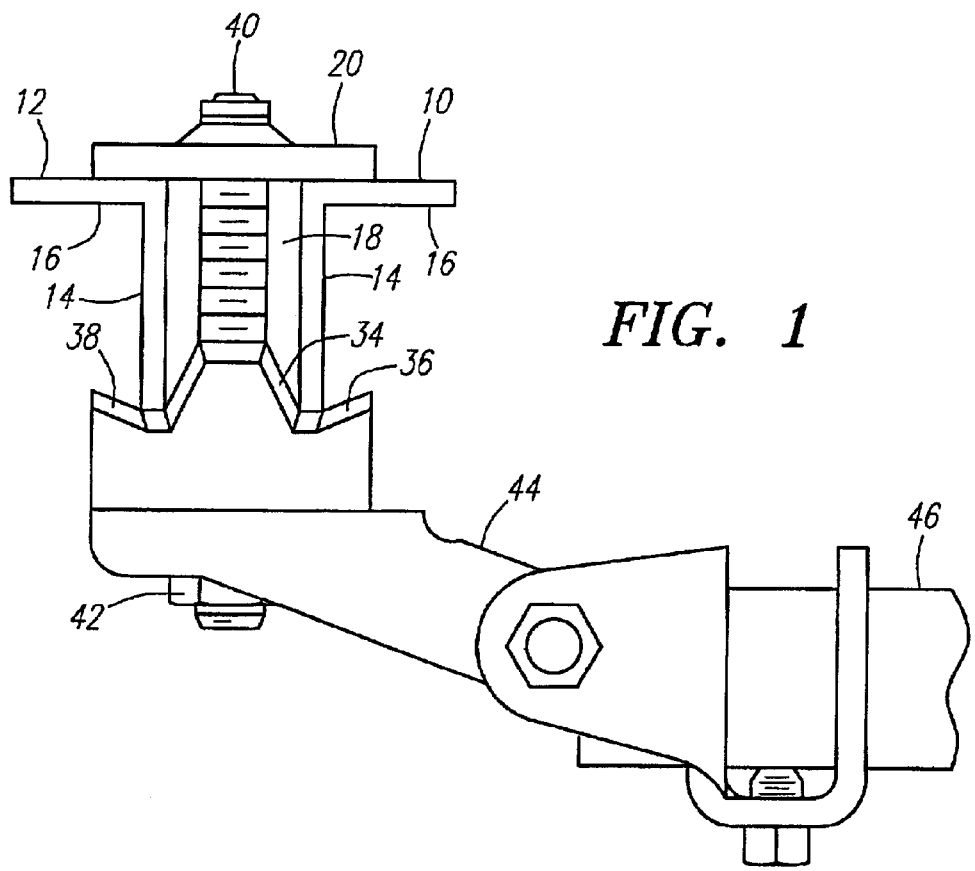
FIG. 1 is a side view of a seismic adapter placed within a beam of a steel web joist and mounting additional hardware thereto; the view including end views of an anchor plate and an engagement plate.
Figure 2:
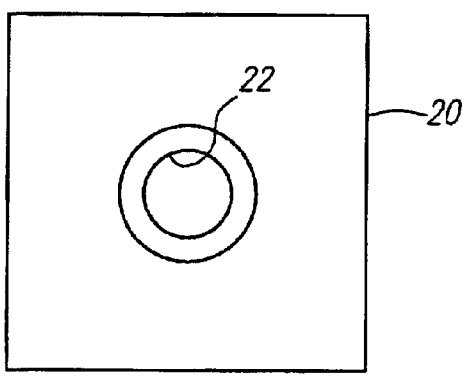
FIG. 2 is a plan view of the anchor plate.
Figure 3:
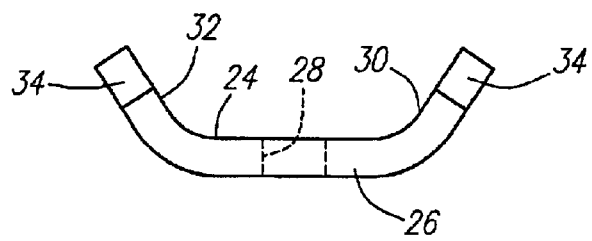
FIG. 3 is a side view of the engagement plate.

Turning in detail to the Figures, one beam of a steel web joist is illustrated as including two angle elements 10 and 12. The angle elements each have a first leg 14 and a second leg 16. The first legs 14 extend in parallel, spaced by a cord space 18 therebetween. The second legs 16 extend in opposite directions from one another, defining a common plane.

The seismic adapter associated with the steel web joist includes an anchor plate 20 which provides plate means for anchoring by extending across the cord space of the steel web joists into juxtaposition with the second legs 16. The anchor plate 20 is a square flat plate with a centrally formed threaded hole 22. The hole typically is sized to receive a threaded half inch stud.

An engagement plate 24 includes a flat anchor portion 26 having a hole 28 centrally extending therethrough. Upstanding engagement portions 30 and 32 extend from either side of the flat anchor portion 26 to provide means for interlocking engagement with the first legs 14 of the steel web joist. The upstanding engagement portions 30 and 32 form obtuse angles with the flat anchor portion 26 with all being formed from the same plate. The distal edge of each of the upstanding engagement portions 30 and 32 defines an engagement profile for interlocking engagement. The engagement profile includes a tongue 34 which is tapered inwardly toward the distal extent thereof. Each engagement profile on the distal edge of the upstanding engagement portions also includes shoulders 36 and 38 to either side of the tongue 34. These shoulders 36 and 38 abut against the lower edges of the first legs 14 of the steel web joist. The shoulders 36 and 38 extend further outwardly from the engagement portions the further they are from the tongue 34.

To draw the anchor plate 20 and the engagement plate 24 together, a stud 40 is shown in threaded engagement with the threaded hole 22 of the anchor plate 20 in FIG. 1. The other end of the stud 40, which is shown in this embodiment to be threaded along its length, extends to and beyond the hole 28 in the engagement plate 24. A nut 42 is threaded onto the lower end of the threaded stud 40 to capture an attachment bracket 44 employed for bracing piping 46 and the like.

In assembly, the stud 40 with the nut 42 in place is extended through the attachment 44 and the engagement plate 24. This assembly is then positioned with the stud 40 extending through the cord space between the legs 14 of the beam of the steel web joist. The stud 40 is then threaded into the anchor plate 20. The nut is next tightened to a torque minimum of 40 ft. lbs. Various adapters may be employed with this system and the orientation of the adapters can vary. The adapter is placed within six inches of the attachment point of any cord element to the upper angle element pair. The taper on the tongue 34 and the extensions of the shoulders 36 provide an interlocking effect to accommodate variations in the cord space of the associated beam of the steel web joist.

Thus, an improved seismic suspension system is disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A seismic suspension system comprising a steel web joist including a beam with two angle elements, each having a first leg and a second leg, the first legs being parallel with a cord space therebetween and the second legs extending in opposite directions;

an anchor plate extending across the cord space and in juxtaposition with each second leg and including a first hole therethrough;

an engagement plate including a flat anchor portion having a second hole therethrough and upstanding engagement portions to either side of the flat anchor portion, the engagement plate extending across the cord space opposite the anchor plate, each upstanding engagement portion having a distal edge with an engagement profile forming a tongue extending between the first legs of the steel web joist in the cord space and shoulders to either side of the tongue, each distal edge abutting and being in interlocking engagement with the first legs with the tongue being tapered inwardly toward the distal extent thereof and the shoulders diverging from one another at less than a straight angle toward the distal extents thereof;

a stud extending from the first hole to and beyond the second hole, the stud being adapted to secure the anchor plate and the engagement plate to the beam of the steel web joist.

2. The system of claim 1, each upstanding engagement portion obtuse angle to the flat anchor portion.

3. The system of claim 1, the stud being threaded and the anchor plate being square flat plate with the first hole therethrough being centrally positioned and threaded to engage the threaded stud.

* * * * *

UNITED STATES PATENT AND TRADEMARK OFFICE
CERTIFICATE OF CORRECTION

PATENT NO. : 6,749,359 B1
DATED : June 15, 2004
INVENTOR(S) : Kraig A. Kirschner It is certified that error appears in the above-identified patent and that said Letters Patent is hereby corrected as shown below:

<u>Column 4,</u>
Line 14, after "portion" (first occurrence), insert -- being at an --.
Line 16, after "being", insert -- a --.

Signed and Sealed this

Sixteenth Day of November, 2004

JON W. DUDAS
*Director of the United States Patent and Trademark Office*